(12) United States Patent
Jha et al.

(10) Patent No.: US 8,851,718 B2
(45) Date of Patent: Oct. 7, 2014

(54) COMBINED AIRCRAFT LANDING AND TAXI LIGHT

(71) Applicant: Goodrich Lighting Systems GmbH, Lippstadt (DE)

(72) Inventors: Anil Kumar Jha, Lippstadt (DE); Andre Hessling, Koblenz (DE); Christian Schön, Mainz (DE)

(73) Assignee: Goodrich Lighting Systems GmbH (DE)

( * ) Notice: Subject to any disclaimer, the term of this patent is extended or adjusted under 35 U.S.C. 154(b) by 110 days.

(21) Appl. No.: 13/712,133

(22) Filed: Dec. 12, 2012

(65) Prior Publication Data

US 2013/0155706 A1 Jun. 20, 2013

(30) Foreign Application Priority Data

Dec. 16, 2011 (EP) .................................... 11194031

(51) Int. Cl.
*B64D 47/06* (2006.01)
*B64D 47/04* (2006.01)

(52) U.S. Cl.
CPC ............... *B64D 47/06* (2013.01); *B64D 47/04* (2013.01); *B64D 2203/00* (2013.01)
USPC ....................... 362/470; 362/241; 362/249.02

(58) Field of Classification Search
CPC ...... B64D 2203/00; B64D 47/04; B64D 47/06
USPC ..................................... 362/241, 249.02, 470
See application file for complete search history.

(56) References Cited

U.S. PATENT DOCUMENTS

| 5,984,494 | A | 11/1999 | Chapman |
|---|---|---|---|
| 6,879,263 | B2 * | 4/2005 | Pederson et al. ......... 340/815.45 |
| 7,079,041 | B2 * | 7/2006 | Fredericks et al. ...... 340/815.45 |
| 7,794,110 | B2 * | 9/2010 | Hirni et al. .................... 362/241 |
| 7,963,683 | B2 * | 6/2011 | Czajkowski et al. ......... 362/517 |
| 2003/0090391 | A1 | 5/2003 | Philiben |
| 2005/0110649 | A1 | 5/2005 | Frederics |
| 2008/0310176 | A1 | 12/2008 | Hirni |
| 2010/0157589 | A1 | 6/2010 | Czajkowski |
| 2012/0140498 | A1 * | 6/2012 | Fabbri et al. ................... 362/470 |
| 2012/0313547 | A1 * | 12/2012 | Barnett et al. ................ 315/297 |

\* cited by examiner

*Primary Examiner* — Stephen F Husar
*Assistant Examiner* — James Cranson, Jr.
(74) *Attorney, Agent, or Firm* — Cantor Colburn LLP

(57) ABSTRACT

An integrated aircraft landing and taxi light includes upper and lower reflector regions in the shape of substantially circular segments and a central longitudinal third reflector region extending between the upper and lower reflector regions. Landing light LEDs are arranged within the upper and lower reflector regions and the outer portions of the central longitudinal reflector region with the diagonals of the LED dies oriented substantially along radial lines extending outward from the center of the light. Taxi light LEDs are arranged within the central and outer portions of the central longitudinal reflector region such that the sides of the LED dies are oriented substantially horizontally and vertically with respect to the aircraft.

9 Claims, 4 Drawing Sheets

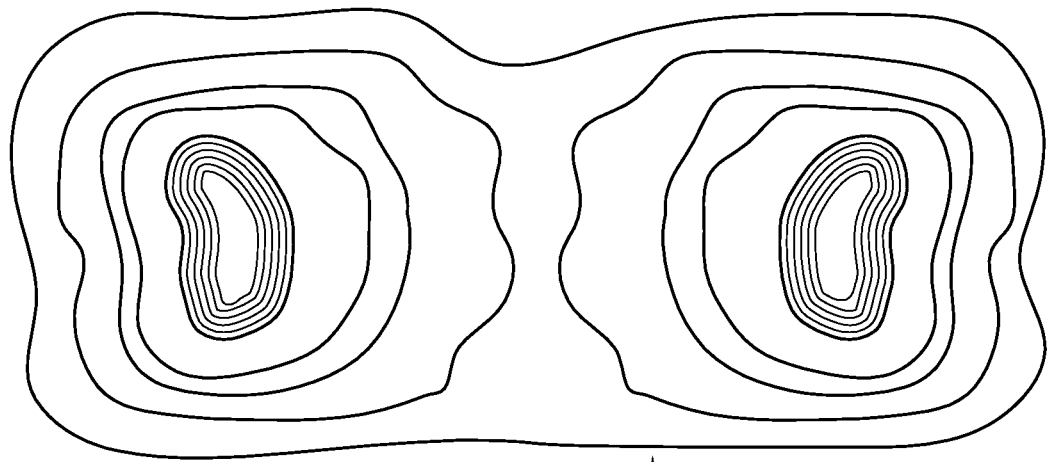
Fig.7
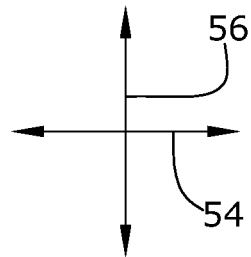
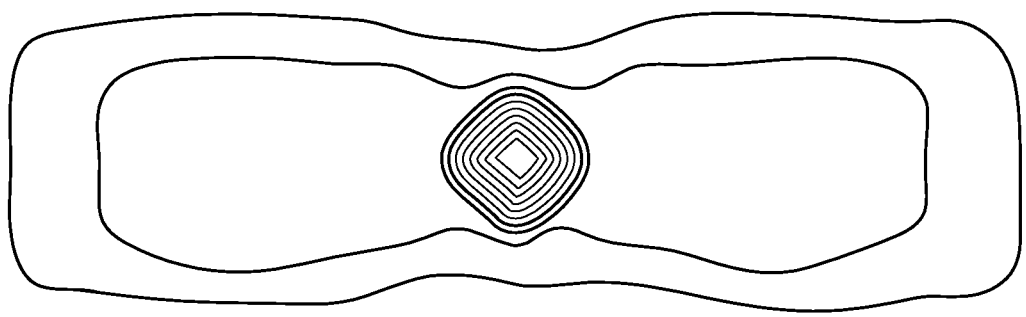
Fig.8
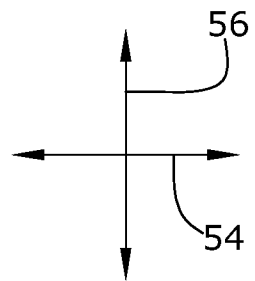

COMBINED AIRCRAFT LANDING AND TAXI LIGHT

BACKGROUND OF THE INVENTION

1. Field of the Invention

The present invention relates to a combined aircraft landing and taxi light having landing light and taxi light LEDs arranged in a space-saving manner.

2. Description of the Prior Art

There are several types of exterior lights mounted to an aircraft. For reducing mounting space on an aircraft, it is advantageous to combine diverse exterior lighting functions within one single housing and, in particular, using at least some of the light sources for different lighting functions of the aircraft light. One example for combining light functions in an aircraft relates to a combined landing and taxi light.

It is an object of the present invention to provide a combined landing and taxi light for an aircraft in which the aircraft light merely has limited dimensions in order to reduce the mounting space at the aircraft.

SUMMARY OF THE INVENTION

The present invention provides a combined aircraft landing and taxi light, comprising
  a housing having a substantially circular light exiting opening,
  a plurality of landing light LEDs arranged within a substantially circular area,
  wherein the substantially circular area comprises a lower substantially half circular first region, and an upper substantially circular segment-shaped second region and a longitudinal third region extending along a diagonal direction through the substantially circular area and having a central portion and widened outer portions at opposite ends,
  wherein the landing light LEDs are arranged within the first and second region and within the widened outer portions of the third region,
  a plurality of first parabolic reflector sections, each of which having an optical axis and being associated to another one of the landing light LEDs which is located on the optical axis of the respective first parabolic reflector section,
  a plurality of taxi light LEDs arranged within the central and outer portions of the third region,
  a plurality of second reflector sections each of which is associated to another one of those taxi light LEDs located within the central portion of the third region,
  wherein those taxi light LEDs located within the widened outer portions of the third region are positioned adjacent to the landing light LEDs arranged within the widened outer portion of the third region, and
  wherein each first parabolic reflector section located within the widened outer portions of the third region is associated to one landing light LED and at least one taxi light LED.

The aircraft light according to the invention combines the landing and taxi light functions and comprises a housing with a substantially circular light exiting opening. This opening typically is closed by a transmissive cover lens. Within the housing there is arranged a plurality of landing light LEDs as well as a plurality of taxi light LEDs. These two types of LEDs are distributed over diverse regions of the circular area defining the light exiting opening. For example, the circular area comprises a lower substantially half circular first region as well as a second region located within an upper substantially half circular region and, in particular, within a circular segment-shaped second region within the upper half circular region. Accordingly, between the first and second regions there remains a space extending longitudinally along a diagonal direction through the substantially circular area of the light exiting opening. The longitudinal third region comprises a central portion and outer portions at the diametrically opposite ends of the central portions wherein these outer ends of the central portion are widened.

The landing light LEDs of the aircraft light according to the invention are arranged within the first and second regions and within the widened outer portions of the third region. These landing light LEDs are used for providing the landing light function of the aircraft light. The landing light LEDs are arranged so as to face first parabolic reflector sections wherein generally each of the landing light LEDs is associated to another one of the first parabolic reflector sections with the landing light LEDs arranged along the optical axes of the respectively associated first parabolic reflector sections. Accordingly, the first parabolic reflector sections reflect the light from the landing light LEDs generally in parallel and through the light exiting opening.

In addition to the first parabolic reflector sections, also second reflector sections are provided within the housing of the aircraft light. These second reflector sections are associated to the taxi light LEDs. The second reflector sections are arranged within the central portion of the third region of the circular light exiting opening area. At both ends, i.e. within the widened outer portions of the third region, there are also arranged taxi light LEDs. However, in contrast to the taxi light LEDs within the central portion of the third region, the taxi light LEDs within the widened outer portions of the third region are associated to the first parabolic reflector sections arranged within the widened outer portions. The taxi light LEDs within the widened outer portions of the third region are located adjacent to the landing light LEDs, i.e. outside of the optical axes of the first parabolic reflector sections within the widened outer portions of the third region. By way of this design, the light emitted from these taxi light LEDs is directed through the light exiting opening and to the left and to the right in the diagonal extension and outside of the area occupied by the light exiting opening.

When using the taxi light function of the aircraft light according to the invention, the taxi light LEDs are operated and provide a strip-like wide-spread illuminated area. The taxi light function can be supported by at least some of the landing light LEDs which then are operated but are dimmed. Accordingly, the taxi light function can be provided by a combination of operated taxi light and landing light LEDs, while the landing light function is performed preferably exclusively by the landing light LEDs.

The advantage of the design of the combined aircraft landing and taxi light according to the invention is that the individual LEDs are arranged at a high density with the illumination functions provided by the aircraft light being very efficient although the housing merely has rather small dimensions.

In one aspect of the present invention, the second reflector sections comprise a plurality of parabolic subsections differently tilted with respect to light emitted from the taxi light LEDs in a direction forming an acute angle with the diagonal extension of the third region.

Generally, the circular light exiting opening of the aircraft landing and taxi light according to the invention is covered by a transmissive protective lens. This lens basically has no optic diffractive features. However, in one aspect of the present invention, within the area of the cover lens aligned with the second reflector sections, the cover lens can be provided with diffractive features so as to spread the light reflected by the second reflector sections in a widely spread horizontal longitudinal area and without directing the light into different directions such e.g. in the vertical direction. These diffractive features of the cover lens results in the light of the taxi light LEDs being completely used for spreading in a left-to-right direction useful for the taxi light function of the aircraft light according to the invention.

In a further aspect of the present invention, each of the second reflector sections is composed of a plurality of at least one of (i) parabolic subsections offset with respect to each other and (ii) a prism. This design of the second reflector sections can be combined with a protective cover lens design as mentioned before. However, according to the invention it is also possible that either the reflector section design or the protective cover lens design is used.

As mentioned above, within the widened outer portions of the third region, the taxi light LEDs are located adjacent to the landing light LEDs. Typically, each first parabolic reflector section is associated to one landing light LED. Adjacent to each of these landing light LEDs, there can be arranged one taxi light LED or up to three taxi light LEDs. The taxi light LEDs should be located adjacent the landing light LEDs in a direction substantially parallel to the diagonal extension of the third region. This helps in using the first parabolic reflector sections for guiding and reflecting the light of the taxi light LEDs towards regions left and right to the light exiting opening and outside the same. Exactly these illuminated regions located diametrically opposite to each other and in extension to the longitudinal third region are suitable to support the taxi light function. In an extreme situation, these illuminated regions can be used also as a runway turn off (RTO) light. Accordingly, in one aspect of the present invention, the aircraft light according to the invention also provides a RTO lighting function.

Unfortunately, LEDs do not have a dot-like light emitting site. LEDs have semiconductor dies with a substantially square shape. For the light distribution necessary for the landing light function, it is advantageous to have the light emitting semiconductor dies of the landing light LEDs oriented in a diamond shape, i.e. that the orthogonal diagonals of the light emitting semiconductor dies extend in horizontal and vertical directions, respectively. In other words, according to this aspect of the present invention, the landing light LEDs comprise substantially square-shaped light emitting semiconductor dies having substantially orthogonal diagonals, wherein the light emitting dies are arranged with one of their diagonals extending substantially parallel to the diagonal extension of the third region.

According to another aspect of the present invention, the aircraft light comprises holder means for carrying both the landing light LEDs and the taxi light LEDs, wherein the holder means are arranged within the housing and between the first and second reflector sections and the light exiting opening and wherein the holder means comprise arms at the end of which the landing light LEDs and the taxi light LEDs are mounted in a manner facing towards the respectively associated first and second reflector sections.

According to another preferred embodiment of the present invention, the landing light LEDs are arranged along an outer ring and an inner ring both extending through the first and second regions, wherein the first parabolic reflector surfaces are also arranged along an outer ring and an inner ring both extending through the first and second regions, wherein the second reflector sections are arranged in the center of the central portion of the third region and within the remaining part of the central portion of the third region, and wherein the taxi light LEDs are arranged in the center of the central portion of the third region and within the remaining part of the third region.

BRIEF DESCRIPTION OF THE DRAWINGS

A full and enabling disclosure of the present invention, including the best mode thereof, enabling one of the ordinary skill in the art to carry out the invention, is set forth in greater detail in the following description, including reference to the accompanying drawing in which:

FIG. 7 shows the light distributions resulting from the parabolic reflector sections associated to the landing light LEDs within the widened outer portions of the third region in case that not the associated landing light LEDs but the taxi light LEDs located adjacent the landing light LEDs are operated, and FIG. 8 shows the combined light distribution resulting from the landing light LEDs and the taxi light LEDs wherein the landing light LEDs are dimmed.

DESCRIPTION OF A PREFERRED EMBODIMENT

Figure 1:
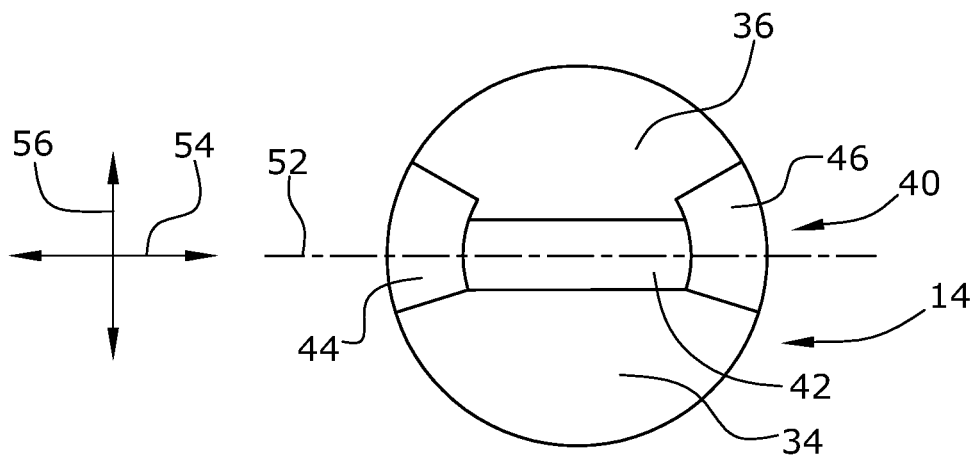
FIG. 1 is a front view of the light exiting opening of an embodiment of an aircraft light according to the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

The design and construction of an embodiment of a combined aircraft landing and taxi light according to the invention is shown in FIGS. 1 to 4. According to FIG. 2, the combined aircraft light 10 comprises a housing 12 having a light exiting opening 14 covered by a protective cover lens 16. The light exiting opening 14 is circular in shape. Also the overall design of the housing 12 is substantially circular and cylindrical, although also other forms for the housing 12 can be used. The housing 12 includes a cooling body 18 for cooling the plurality of LEDs used in the aircraft light 10 according to FIGS. 1 to 4.

Figure 2:
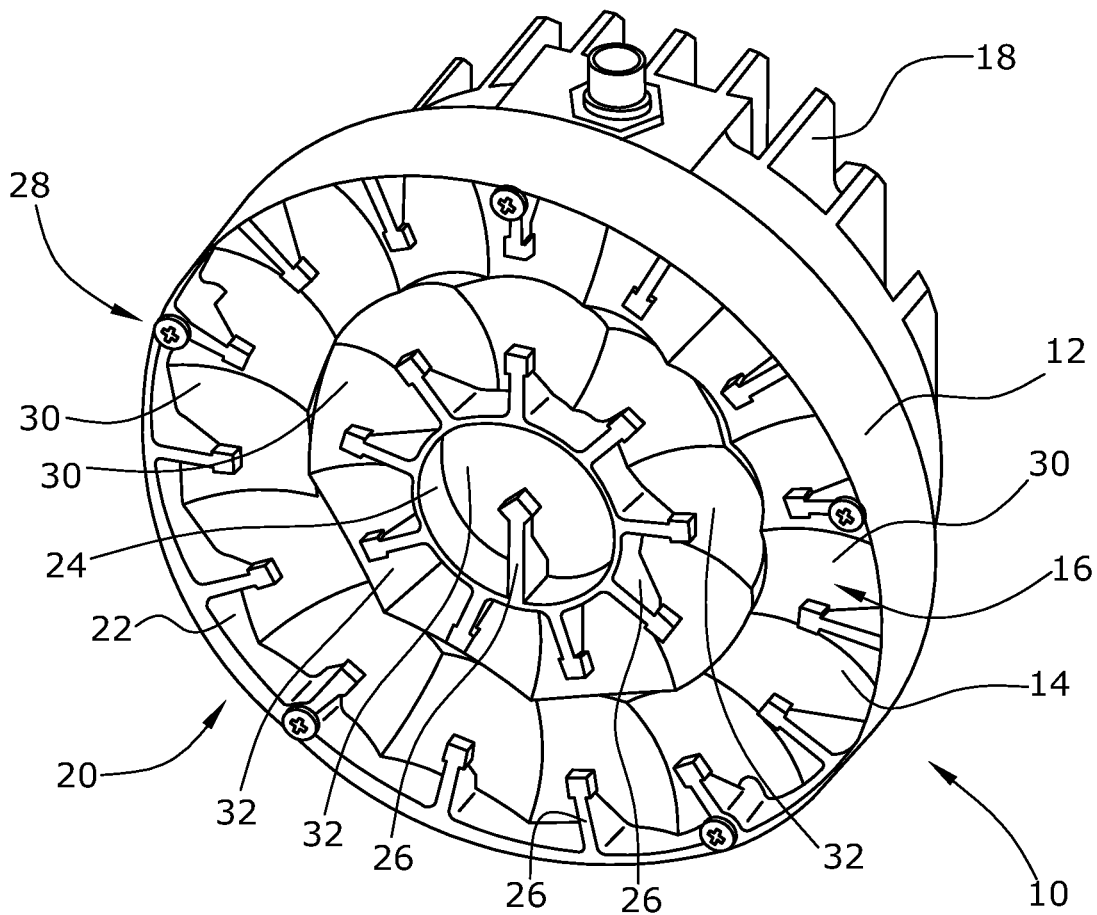
FIG. 2 is a perspective front view of the aircraft light also showing part of the housing and several cooling features.

As e.g. shown in FIG. 2, the housing 12 comprises LED holding means 20 including an outer LED holder 22 and an inner LED holder 24. The two holders 22,24 are provided with radially extending holding arms 26 which are beam-like and carry LEDs at their ends. The LEDs face a reflector arrangement 28 of the aircraft light 10 also located within the housing 12. The reflector arrangement 28 comprises different types of reflector sections 30,32 explained hereinbelow.

In general, in the aircraft light 10 according to this embodiment, the circular area defined by the light exiting opening 14 can be divided into different regions as shown in FIG. 1. Accordingly, the circular light exiting opening 14 comprises a lower substantially half-circular first region 34 and an upper substantially circular segment-shaped second region 36. In both of these regions 34,36, the aircraft light 10 is provided with landing light LEDs 38 as shown in FIG. 3.

Between the first and second regions 34 and 36, there is arranged a third, middle region 40 having a central portion 42 and two diametrically opposite widened outer portions 44,46. As shown in FIG. 3, within central portion 42 there are arranged taxi light LEDs 48 while in the widened outer portions 44,46 both landing light LEDs 38 as well as taxi light LEDs 48 are arranged. Within the widened outer portions 44 and 46, in this embodiment, several pairs of landing light and taxi light LEDs 38,48 are arranged adjacent to each other. This is once again also shown in FIG. 4 showing a cross-sectional view along plane IV-IV of FIG. 3.

Figure 3:
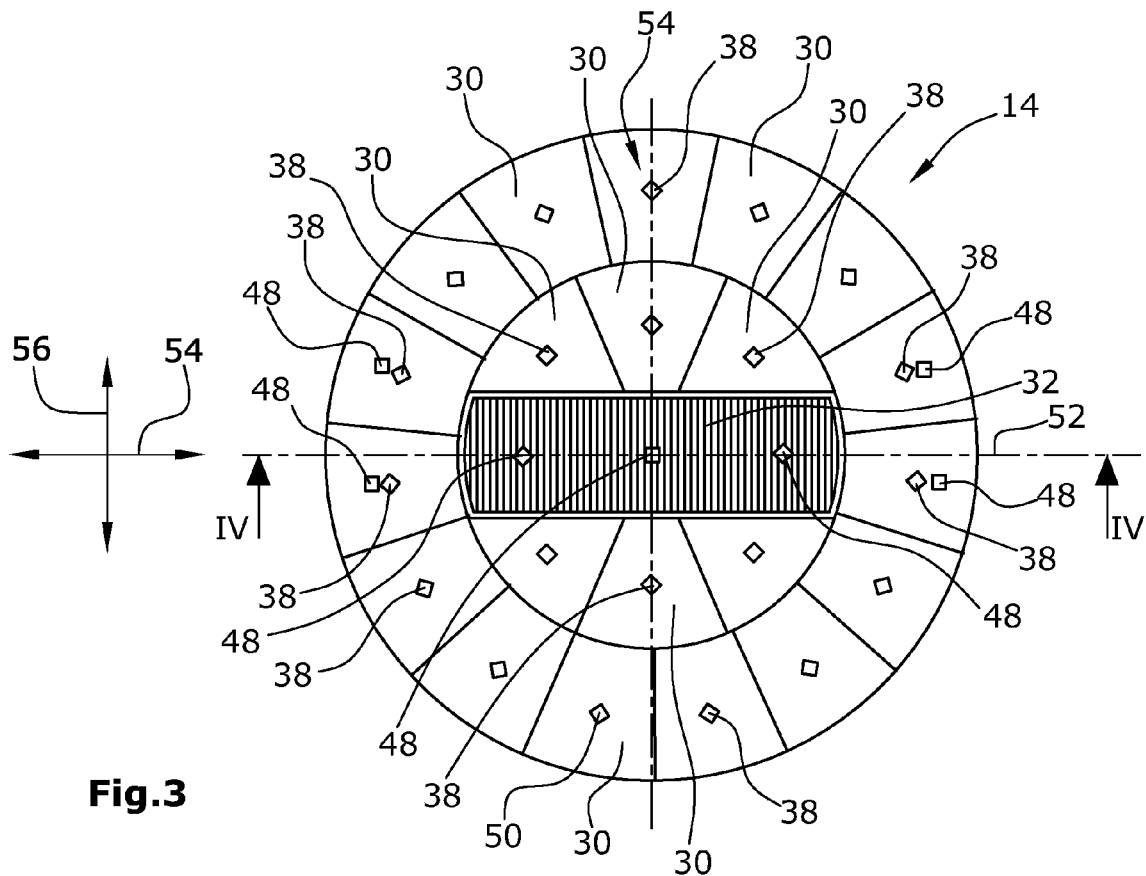
FIG. 3 is a front view of the arrangement of the LEDs and the reflector (with the protective cover lens and LED holder means omitted)

Also as best shown in FIG. 3, along an outer ring-like region of the light exiting opening 14 there are arranged a plurality of the first reflector sections 30. These reflector sections 30 are also arranged within an upper and a lower annular partial sub region of an annular inner region. The area covered by the first reflector sections 30 corresponds to the first and second regions as well as to the widened outer portions 44,46 of the third region 40 as shown in FIG. 1.

Within the central portion 42 of the third region, in which the taxi light LEDs 48 are arranged, the second reflector sections 32 are located.

Figure 4:
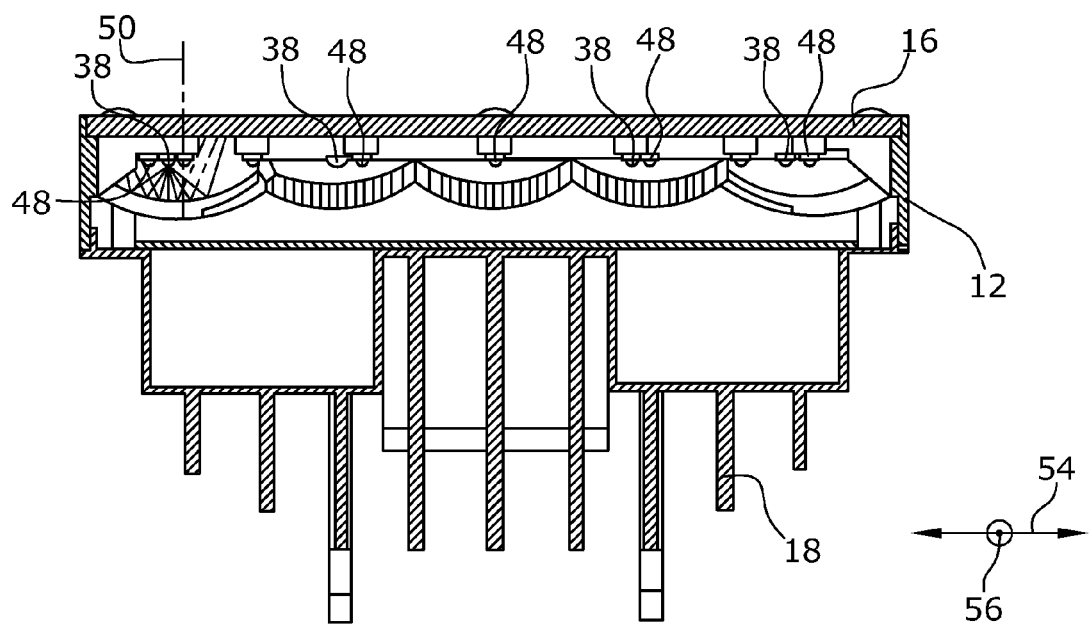
FIG. 4 is a cross-section along plane IV-IV of FIG. 3.
Figure 5:
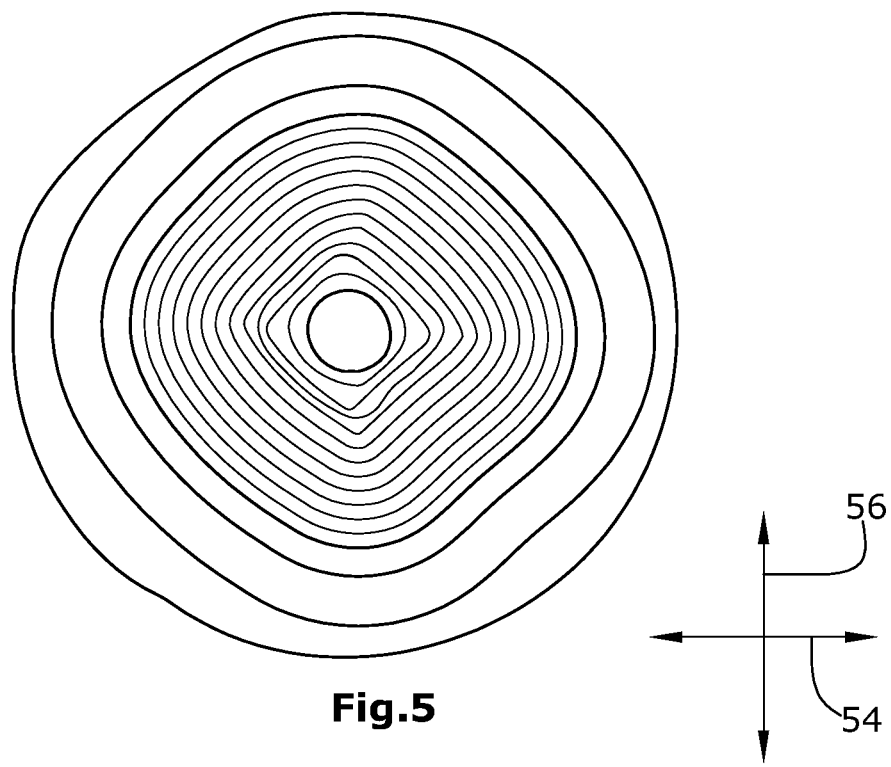
FIG. 5 shows the light distribution in the landing lighting function of the aircraft light.

The shape of the first reflector sections 30 is substantially parabolic, with the landing light LEDs 38 being arranged along the optical axes 50 as shown e.g. in FIG. 4 as well as in FIG. 3. Accordingly, light emitted by the landing light LEDs 38 is reflected by the first parabolic reflector sections 30 substantially in parallel and substantially orthogonal through the plane defined by the light exiting opening 14. However, the reflected light of the landing light LEDs 38 also could be reflected in another general direction, with all the light being directed in same general direction. This is advantageous for performing the landing light functionality.

When operating in the taxi light mode, the taxi light LEDs 48 are activated. The second reflector sections 32 serve for a light reflection spread to the left and to the right along the extension of the diagonal 52 shown in FIGS. 1 and 3. In this embodiment, the second reflector sections 32 consist of parabolically shaped partial sections offset and/or tilted in a different manner with respect to each other. Other reflector forms for obtaining a light reflection widely spread in the horizontal direction and without spreading in the vertical direction can also be used.

The additional taxi light LEDs 48 arranged in the two widened outer portions 44,46 of the third region 40 are used for illuminating areas adjacent the light exiting opening 14 and located along the extension of the diagonal 52.

As can be seen best in FIG. 3, the landing light LEDs 38 are oriented so as to look like a diamond shape. The landing light LEDs 38 (as well as the taxi light LEDs 48) consist of square-shaped semiconductor dies 54 having two substantially orthogonal diagonals, respectively. In order to use efficiently the special shape of the dies 54 for the landing lighting function, it is advantageous to orient the semiconductor dies 54 so that one of their diagonals is oriented in the horizontal direction 55 and the other diagonal is oriented in the vertical direction 56. This helps to distribute the light coming from the individual landing light LED dies 54 in the desired direction. The taxi light LEDs 48 have semiconductor dies 58 oriented like a square, with one pair of parallel edges extending in the horizontal direction 55 and the other pair of parallel edges extending in the vertical direction 56. Accordingly, this helps to distribute the light coming from the landing light LED dies 54 mainly in the horizontal direction 55 for spreading the light in this direction instead of in the vertical direction 56.

In FIGS. 5 to 8 the individual light distributions are shown resulting from either the landing light LEDs 38 or the taxi light LEDs 48 or both. According to FIG. 5, the light distribution of the landing light LEDs 38 is substantially symmetrical in the horizontal and vertical direction 55,56. One can see the illuminated area is diamond-shaped resulting from the diamond-shaped orientation of the landing light LEDs 38.

Figure 6:
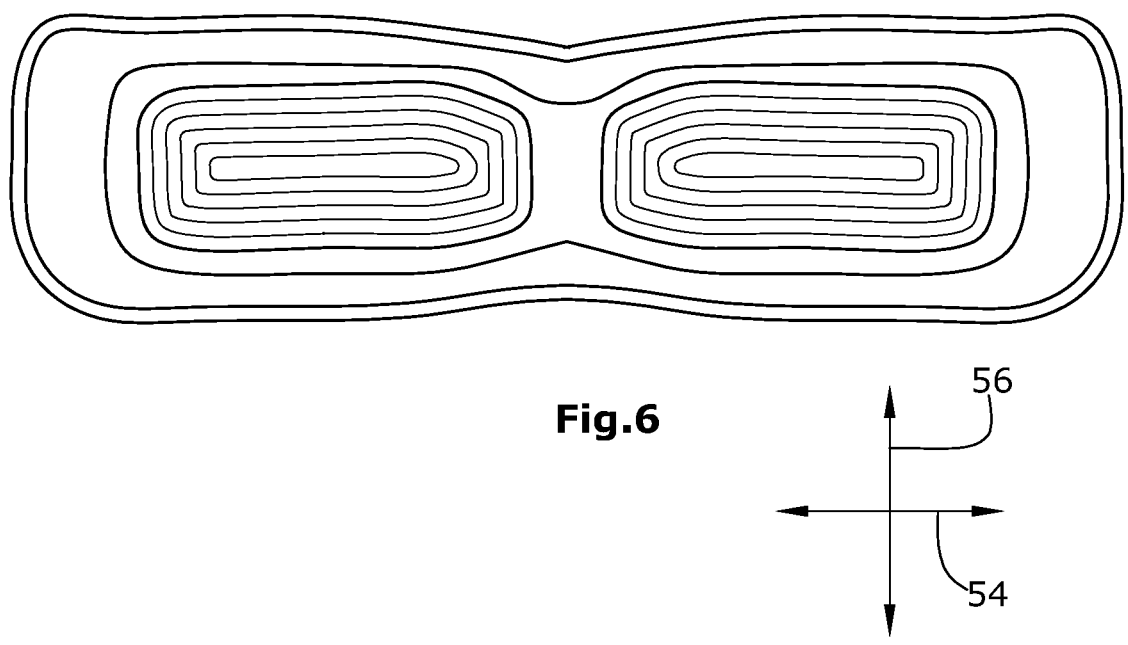
FIG. 6 shows the light distribution resulting from the special reflector sections associated to the taxi light LEDs only.

In FIG. 6 the light distribution resulting from the taxi light LEDs 48 arranged within the central portion 42 of the third region 40 is shown.

In FIG. 7, there is shown the light distribution of the landing light LEDs 38 located within the widened outer portions 44,46 of the third region 40.

Finally, in FIG. 8 the combination of the landing light and taxi light LEDs 38,48 is shown with the landing light LEDs 38 being dimmed.

The main features and characteristics of the present invention can be summarized as follows making reference to a specific design of an aircraft light according to the present invention.

As already mentioned above, this invention provides three modes of operation of aerospace exterior lighting in a single housing, wherein the first mode is that of a landing light, the second mode is that of a taxi light and the third mode is that of a combined landing and taxi light function.

Landing Light Optical Setup and Light Distribution

To achieve high intensity at the peak, the optical systems should be able to project a sharp image of the LED die in the projection plane, hence primary optics (e.g. reflector, TIR lenses or ashprical lens) should be made with a large focal length and that leads to a larger optical system.

With the below listed combination, light intensity and its distribution for the landing and taxi light can be achieved with optimum envelope size.

LED facing towards reflector.

LED rotated 45° in a way that the LED die image produces diamond shape instead of square on the reflector to maximize horizontal and vertical distribution.

Reflector size adjusted to capture at least 140° viewing angle of LED.

Focal length of reflector adjusted to achieve±5° horizontal and vertical distribution.

Taxi Light Optical Setup and Light Distribution

To get horizontal distribution for taxi light, dedicated reflectors are created in a way that it spreads light till the required horizontal angle however produce minimum light where the landing light is already produced. Additional LEDs are placed in a way that it adds up intensity to horizontal distribution.

To achieve peak intensity for taxi light, landing light peak intensity can be reduced and utilized by reducing electrical current.

Landing and Taxi Combine Optical Setup and Light Distribution

By driving both (landing and taxi) setups with full electrical power, peak intensity and light distribution requirement can be met.

Multiple LEDs are necessary to get the required luminous flux for landing and taxi light function. It is fairly easy to put numbers of LEDs in a housing, but the key issue is collection of entire flux and directing them to a narrow angle for landing function and wide angle in horizontal direction for taxi function in the same housing with minimum flux loss. Since LEDs are not a point light source, fair amount of luminous flux is lost in several directions. To avoid luminous flux loss, the light beam pattern can be made in a way that the entire flux is sent in a direction only where required.

Reflectors are used to collect light from the LEDs. Since the LEDs are facing rearwards, the reflector focal length can be maximized and minimize the beam angle, this will produce peak intensity for the landing function. The LED die is rotated 45° with respect to its optical axis, hence its diamond shape, the LED die image falls on the reflector, diagonal length of the LED image increases horizontal and vertical distribution for landing function. Dedicated reflectors for taxi light are designed in a way that gives flat horizontal distribution starting from horizontal angle where landing light beam angle ends till the far required angle. This will reduce energy required for taxi function and utilize energy from landing function.

Additionally defocused LEDs (with respect to landing function reflector) are arranged adjacent to the landing light LED, placed in a way that these LEDs add up intensity in the horizontal direction without losing flux in vertical direction.

The structure of the invention resides in the integration of the landing and taxi light beam pattern with LEDs in a single housing with minimal flux loss.

Key to the invention is a combination of two or more of the following:

1) A mirror—telescope optic set-up to collect maximum flux of LED.
2) The solely landing light dedicated LEDs to be rotated 45° degrees so that the rectangular shape of the LED die creates a diamond shaped projection sitting on the tip, maximizing horizontal and vertical spread.
3) The dedicated taxi light LEDs to be oriented in 0°, emitting into a free form reflector creating a second light distribution leading to a basically rectangular distribution with a significant intensity reduction in the centre.
4) A third reflector/LED arrangement where a collimated centre beam is created with one LED and an off-angle, defocused second LED, creates a third light distribution that supports the taxi light distribution creating a wider distribution in the outboard angles, giving the taxi light a desirable "bone" like distribution.
5) The dedicated landing lights sections having two dimming levels, a full power mode for landing light function and significant reduced level creating the centre illumination for the taxi light function.

The invention can be used for any lighting system in order to enhance efficiency of the entire luminous flux of the light source.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. Combined aircraft landing and taxi light, comprising
   a housing (12) having a substantially circular light exiting opening (14),
   a plurality of landing light LEDs (38) arranged within a substantially circular area,
   wherein the substantially circular area comprises a lower substantially half circular first region (34), and an upper substantially circular segment-shaped second region (36) and a longitudinal third region (40) extending along a diagonal direction through the substantially circular area and having a central portion (42) and widened outer portions (44,46) at opposite ends,
   wherein the landing light LEDs (38) are arranged within the first and second region (36) and within the widened outer portions (44,46) of the third region (40),
   a plurality of first parabolic reflector sections (30), each of which having an optical axis and being associated to another one of the landing light LEDs (38) which is located on the optical axis of the respective first parabolic reflector section (30),
   a plurality of taxi light LEDs (48) arranged within the central and outer portions of the third region (40),
   a plurality of second reflector sections (32) each of which is associated to another one of those taxi light LEDs (48) located within the central portion (42) of the third region (40),
   wherein those taxi light LEDs (48) located within the widened outer portions (44,46) of the third region (40) are positioned adjacent to the landing light LEDs (38) arranged within the widened outer portions (44,46) of the third region (40), and
   wherein each first parabolic reflector section (30) located within the widened outer portions (44,46) of the third region (40) is associated to one landing light LED (38) and at least one taxi light LED (48).

2. The combined aircraft landing and taxi light according to claim 1, wherein the second reflector sections (32) comprise a plurality of parabolic subsections differently tilted with respect to light emitted from the taxi light LEDs (48) in a direction forming an acute angle with the diagonal extension (52) of the third region (40).

3. The combined aircraft landing and taxi light according to claim 1, wherein, for spreading light emitted from the taxi light LEDs (48), each of the second reflector sections (32) is composed of a plurality of at least one of (i) parabolic subsections offset with respect to each other and (ii) prism.

4. The combined aircraft landing and taxi light according to claim 1, wherein the light exiting opening (14) is covered by a light transmissive protective cover (16) having a prism-like structure within a region aligned with the central portion (42) of the third region (40) for spreading light emitted from the taxi light LEDs (48) in a direction forming an acute angle with the diagonal extension of the third region (40).

5. The combined aircraft landing and taxi light according to claim 1, wherein those first parabolic reflector sections (30) located within the widened outer portions (44,46) of the third region (40), direct light emitted from the taxi light LEDs (48) in a direction forming an acute angle with the diagonal extension of the third region (40) and beyond the outer ends of the third region (40).

6. The combined aircraft landing and taxi light according to claim 1, wherein the landing light LEDs (38) comprise substantially square-shaped light emitting semiconductor dies having substantially orthogonal diagonals and wherein the light emitting dies are arranged with one of their diagonals extending substantially parallel to the diagonal extension of the third region (40).

7. The combined aircraft landing and taxi light according to claim 1, wherein within the widened outer portions (44,46) of the third region (40) each first parabolic reflector (30) section is associated to a pair of adjacent landing light and taxi light LEDs (38,48).

8. The combined aircraft landing and taxi light according to claim 1, further comprising holder means (20) for carrying both the landing light LEDs (38) and the taxi light LEDs (48), wherein the holder means (20) are arranged within the housing (12) and between the first and second reflector sections (32) and the light exiting opening (14) and wherein the holder means (20) comprise arms at the end of which the landing light LEDs (38) and the taxi light LEDs (48) are mounted in a manner facing towards the respectively associated first and second reflector sections (32).

9. The combined aircraft landing and taxi light according claim 1, wherein the landing light LEDs (38) are arranged along an outer ring and an inner ring both extending through the first and second regions (34,36), wherein the first parabolic reflector (30) surfaces are also arranged along an outer ring and an inner ring both extending through the first and second regions (34,36), wherein the second reflector sections (32) are arranged in the center of the central portion (42) of the third region (40) and within the remaining part of the central portion (42) of the third region (40), and wherein the taxi light LEDs (48) are arranged in the center of the central portion (42) of the third region (40) and within the remaining part of the third region (40).

\* \* \* \* \*